(12) United States Patent
Kim

(10) Patent No.: US 8,454,237 B2
(45) Date of Patent: Jun. 4, 2013

(54) SPINDLE MOTOR

(75) Inventor: Young Tae Kim, Seoul (KR)

(73) Assignee: Samsung Electro-Mechanics Co., Ltd., Suwon-Si, Gyeonggi-do (KR)

( * ) Notice: Subject to any disclaimer, the term of this patent is extended or adjusted under 35 U.S.C. 154(b) by 160 days.

(21) Appl. No.: 12/874,103

(22) Filed: Sep. 1, 2010

(65) Prior Publication Data

US 2011/0280509 A1 Nov. 17, 2011

(30) Foreign Application Priority Data

May 17, 2010 (KR) ........................ 10-2010-0045934

(51) Int. Cl.
*F16C 32/06* (2006.01)
(52) U.S. Cl.
USPC ............ 384/100; 384/113; 384/115; 384/123
(58) Field of Classification Search
USPC ................. 384/100, 107, 111, 114–115, 120, 384/123; 216/17; 205/640, 687
See application file for complete search history.

(56) References Cited

U.S. PATENT DOCUMENTS

| | | | | |
|---|---|---|---|---|
| 5,423,612 A * | 6/1995 | Zang et al. | ..................... | 384/119 |
| 5,707,154 A * | 1/1998 | Ichiyama | ..................... | 384/107 |
| 5,765,952 A * | 6/1998 | Dekker et al. | ................. | 384/107 |
| 6,196,722 B1 * | 3/2001 | Asada et al. | ................... | 384/107 |
| 6,246,136 B1 * | 6/2001 | Ichiyama | ......................... | 310/90 |
| 6,316,857 B1 * | 11/2001 | Jeong | ............................... | 310/90 |
| 6,361,214 B1 * | 3/2002 | Ichiyama | ..................... | 384/115 |
| 6,493,181 B1 * | 12/2002 | Ichiyama | ..................... | 384/123 |
| 6,532,662 B2 * | 3/2003 | Kobayashi et al. | ......... | 29/898.02 |
| 7,976,221 B2 * | 7/2011 | Huang et al. | ................... | 384/107 |
| 2002/0114547 A1 * | 8/2002 | Nottingham | ................... | 384/110 |
| 2004/0136625 A1 * | 7/2004 | Asada et al. | ................... | 384/107 |
| 2006/0029313 A1 * | 2/2006 | Hamada et al. | ............... | 384/107 |
| 2007/0086686 A1 * | 4/2007 | Ishikawa et al. | .............. | 384/100 |
| 2008/0260309 A1 * | 10/2008 | Huang et al. | ................... | 384/107 |
| 2009/0046960 A1 * | 2/2009 | Hibi et al. | ........................ | 310/90 |

FOREIGN PATENT DOCUMENTS

| | | | |
|---|---|---|---|
| JP | 11-159525 A | * | 6/1999 |
| JP | 11-252857 | | 9/1999 |
| JP | 2003-191133 A | * | 7/2003 |
| KR | 100820767 B1 | | 4/2008 |

OTHER PUBLICATIONS

Office Action from counterpart Korean Patent Application No. 10-2010-0045934, May 16, 2011, 3pages.

* cited by examiner

*Primary Examiner* — Marcus Charles
(74) *Attorney, Agent, or Firm* — Blakely Sokoloff Taylor & Zafman LLP

(57) ABSTRACT

The spindle motor includes a rotating shaft and a sleeve. The rotating shaft has a stepped portion in a fluid dynamic pressure shafting system. The sleeve is fitted over the circumferential outer surface of the rotating shaft. A sleeve recess is formed in the inner surface of the sleeve so that the edges of the stepped portion are spaced apart from the sleeve.

5 Claims, 3 Drawing Sheets

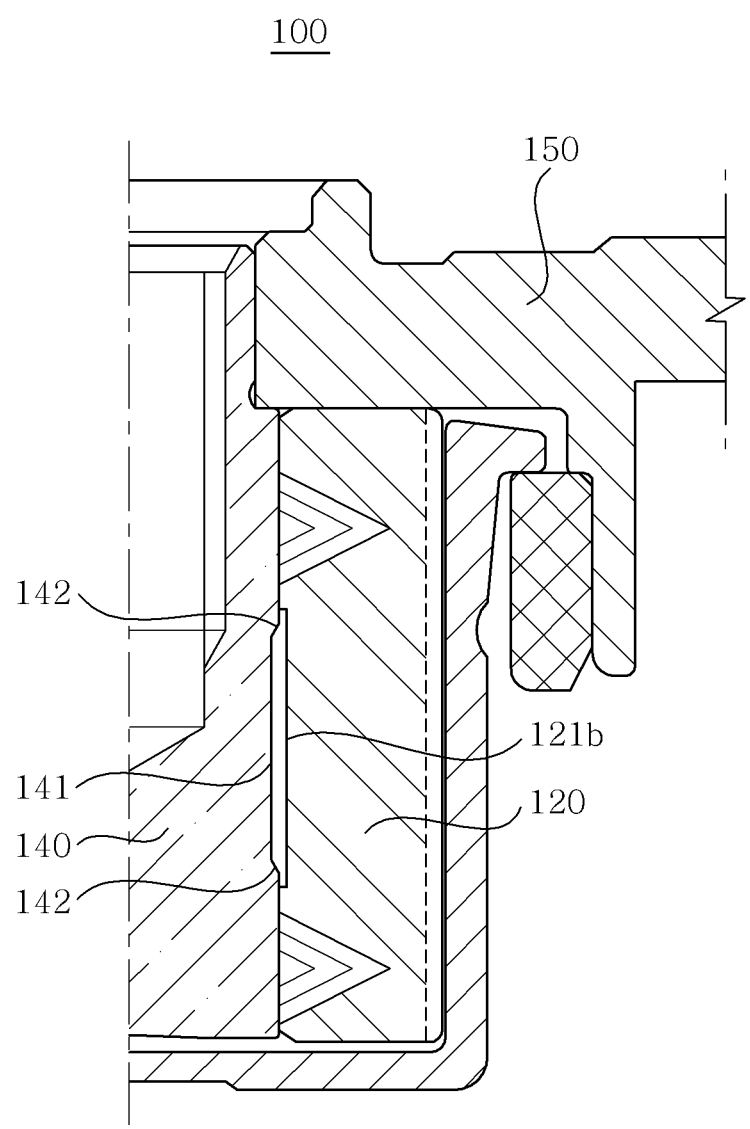

SPINDLE MOTOR

CROSS REFERENCE TO RELATED APPLICATION

This application claims the benefit of Korean Patent Application No. 10-2010-0045934, filed May 17, 2010, entitled "Spindle motor", which is hereby incorporated by reference in its entirety into this application.

BACKGROUND OF THE INVENTION

1. Technical Field

The present invention relates to a spindle motor.

2. Description of the Related Art

Generally, in spindle motors, sleeves which are provided around rotating shafts rotatably support the rotating shafts, thus ensuring a high level of operating characteristics. Because of these characteristics, spindle motors are widely used as drive units of recording media, such as hard disk drives, optical disk drives, etc., which need high speed rotation.

Such a spindle motor uses a fluid dynamic bearing which is operated in such a way that a predetermined amount of fluid is injected between a rotating shaft and a sleeve, which coaxially supports the rotating shaft, so as to form dynamic pressure when the rotating shaft rotates, thus making the rotating shaft rotate more smoothly.

Specially, after 2000's shafting systems of spindle motors have largely gone away from using ball bearings to the use of dynamic bearings. Compared to existing ball bearings, the dynamic bearings reduce noise, enhance the impact resistance, and have an extended lifetime. For example, in a fluid dynamic shafting system, there is a dynamic pressure gap between a rotating shaft and a sleeve. A dynamic pressure depression is formed in the sleeve or the rotating shaft. When the rotating shaft rotates with respect to the sleeve, fluid is moved by this relative rotation. Pressure generated by the movement of the fluid serves as a bearing. However, there are problems of friction with the fluid and contact between the rotating shaft and the sleeve.

In an effort to overcome these problems, a spindle motor in which a spacing depression is formed in a rotating shaft or sleeve to reduce friction attributable to fluid was proposed. However, for example, in the case where the spacing depression is formed in the rotating shaft, edges formed on the rotating shaft by the spacing depression may come into contact with the surface of the sleeve and thus damage the sleeve.

Therefore, studies into a spindle motor which can be manufactured by inexpensive processes, such as an ECM process, unlike the conventional technique which includes a pressing process using a plastic deformation principle, and which aims to solve the problem of contact between the rotating shaft and the sleeve which is induced by the edges of the spacing depression formed in the rotating shaft have been conducted.

SUMMARY OF THE INVENTION

The present invention has been made in an effort to provide a spindle motor which can prevent a rotating shaft and a sleeve from being brought into contact with each other and thus becoming worn by rotation of the motor.

In an exemplary spindle motor according to an embodiment of the present invention, a rotating shaft has a stepped portion in a fluid dynamic pressure shafting system. A sleeve is fitted over a circumferential outer surface of the rotating shaft. A sleeve recess is formed in an inner surface of the sleeve so that an edge of the stepped portion is spaced apart from the sleeve.

The sleeve recess may be formed in the sleeve at a position corresponding to the edge of the stepped portion.

The sleeve recess may have a band shape which surrounds the stepped portion of the rotating shaft.

The sleeve may be formed by molding, and the sleeve recess may be integrally formed in the sleeve when the sleeve is formed by molding.

Furthermore, a hardness of the rotating shaft may be greater than a hardness of the sleeve.

The sleeve recess may be formed by an ECM (electrochemical machining) process.

BRIEF DESCRIPTION OF THE DRAWINGS

The above and other objects, features and advantages of the present invention will be more clearly understood from the following detailed description taken in conjunction with the accompanying drawings, in which:

FIG. 3 is a partial enlarged sectional view illustrating a second embodiment of a spindle motor according to the present invention.

DESCRIPTION OF THE PREFERRED EMBODIMENTS

Figure 1:
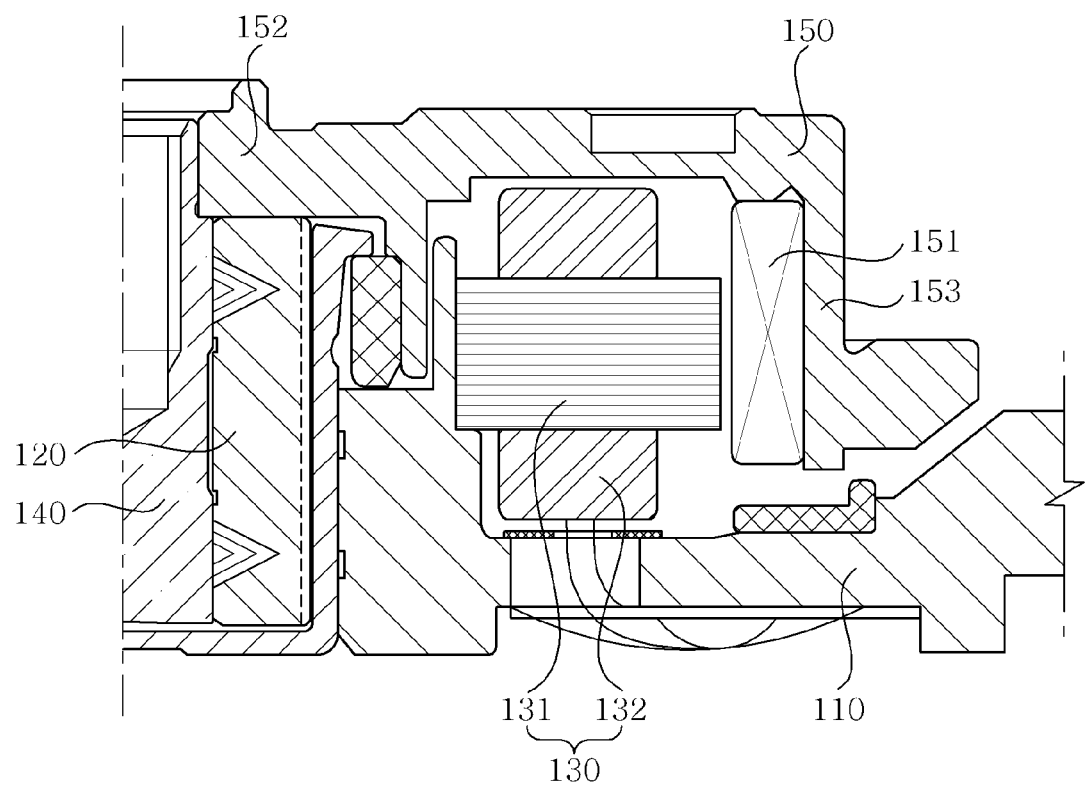
FIG. 1 is a partial sectional view illustrating a spindle motor, according to the present invention.

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having had their meanings and concepts adapted to the scope and sprit of the present invention so that the technology of the present invention could be better understood.

Hereinafter, embodiments of the present invention will be described in detail with reference to the attached drawings.

Figure 2:
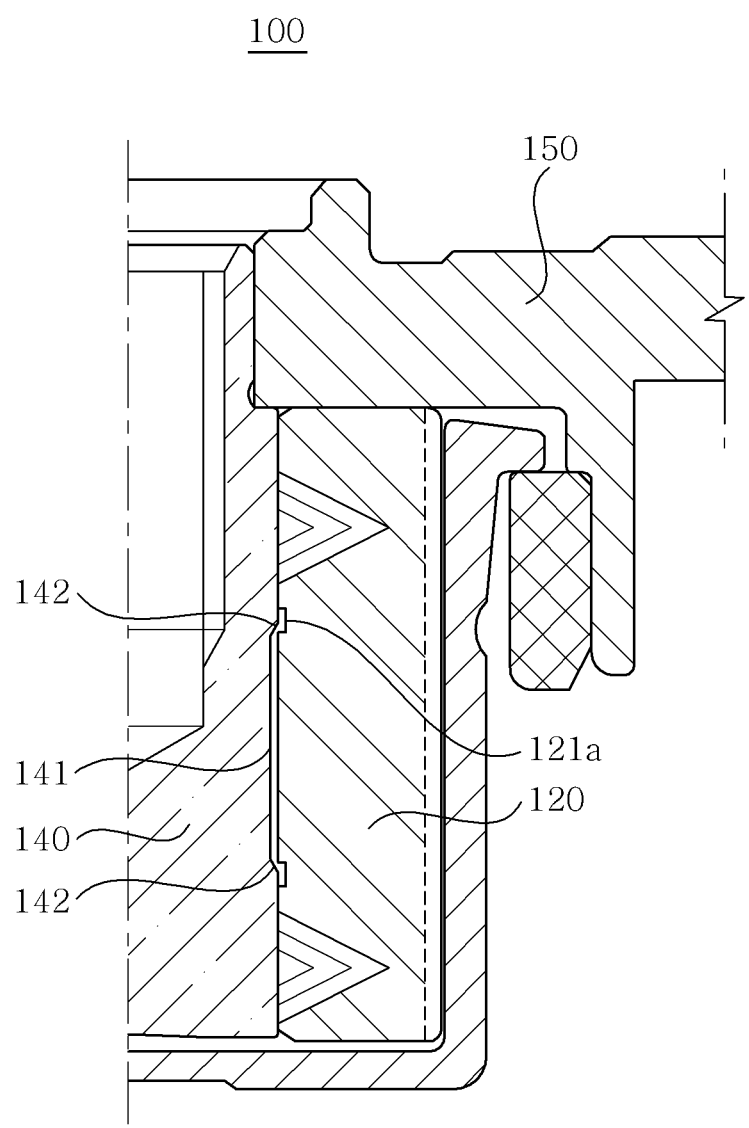
FIG. 2 is a partial enlarged sectional view illustrating a first embodiment of a spindle motor according to the present invention.

FIG. 1 is a partial sectional view illustrating a spindle motor 100, according to the present invention. FIG. 2 is a partial enlarged sectional view illustrating a first embodiment of a spindle motor 100 according to the present invention. FIG. 3 is a partial enlarged sectional view illustrating a second embodiment of a spindle motor 100 according to the present invention.

As shown in FIG. 1, the spindle motor 100 according to the present invention includes a base plate 110, a sleeve 120, an armature 130, a rotating shaft 140 and a hub 150.

The base plate 110 supports the entire spindle motor 100 thereon and is mounted to a device, such as a hard disk drive or the like, in which the spindle motor 100 is installed. The base plate 110 is generally made of light material, such as an aluminum plate or aluminum alloy plate. Alternatively, the base plate 110 may be made of a steel plate.

Furthermore, a coupling part (not shown) to which the sleeve 120 is coupled protrudes from the base plate 110. A coupling hole (not shown) is formed through a central portion of the coupling part. The coupling hole has a diameter corresponding to an outer diameter of the sleeve 120 such that the sleeve 120 is fitted into the coupling hole. In other words, the sleeve 120 is coupled to the coupling part of the base plate 110 by fitting the sleeve 120 into the coupling hole. To reliably fasten the sleeve 120 to the coupling part, a separate adhesion process used to adhere the sleeve 120 to the coupling part using an adhesive may be carried out. Alternatively, the sleeve 120 may be fastened to the coupling part in such a way as to force-fit the sleeve 120 into the coupling hole under a predetermined amount of pressure.

The sleeve 120 rotatably supports the rotating shaft 140. The sleeve 120 generally has a hollow cylindrical shape. A fluid dynamic bearing is provided in a circumferential inner surface of the sleeve 120 which faces the rotating shaft 140. The construction of the sleeve 120 according to exemplary embodiments of the present invention will be described in more detail herein below with reference to FIGS. 2 and 3.

The armature 130 forms an electric field using external power applied thereto so as to rotate the hub 150 onto which an optical disk is placed. The armature 130 includes a core 131 which is formed by placing thin metal plates on top of one another, and a coil 132 which is wound around the core 131 many times.

The core 131 is firmly fitted over the circumferential outer surface of the coupling part of the base plate 110. The coil 132 which is wound around the core 131 forms an electric field when a current is applied to the coil 132, thus forming electromagnetic force formed between the coil 132 and a magnet 151 provided in the hub 150, thereby rotating the hub 150 using the electromagnetic force.

The rotating shaft 140 supports the hub 150. In addition, the rotating shaft 140 is inserted into the sleeve 120 and rotatably supported by the sleeve 120.

In the spindle motor 100 according to the embodiments of the present invention, if the sleeve 120 is formed by injection molding, a depression cannot be formed in the dynamic pressure shafting system of the sleeve 120 during the injection molding process. Therefore, a stepped portion (or a depression) is formed in the rotating shaft 140.

As such, the embodiments of the present invention are described on the assumption that the stepped portion is formed in the dynamic pressure shafting system of the rotating shaft 140.

The hub 150 seats an optical disk (not shown), such as a hard disk, thereon and rotates it. The hub 150 includes a circular plate 152 which is firmly fitted over the rotating shaft 140, and an annular rim part 153 which extends from an outer edge of the circular plate 152.

In detail, the rotating shaft 140 is fitted into the central portion of the circular plate 152. The rim part 153 extends a predetermined length from the outer edge of the circular plate 152 in the axial direction of the rotating shaft 140 such that the circumferential inner surface of the rim part 153 faces the armature 130. The magnet 151, which forms a magnetic field to generate electromagnetic force between it and the electric field formed by the coil 132, is fastened to the circumferential inner surface of the rim part 153.

FIG. 2 is a partial enlarged sectional view illustrating a spindle motor 100 according to the first embodiment of the present invention. In the first embodiment, a stepped portion 141 is formed in a fluid dynamic shafting system of the rotating shaft 140. The stepped portion 141 is provided in the rotating shaft 140 by forming a protrusion or depression, because it cannot be formed in the sleeve 120 which is formed by injection molding.

In the structure wherein the stepped portion 141 is formed in the rotating shaft 140 while the sleeve 120 has no means for avoiding the contact therebetween, when the operation of the motor begins or stops, edges 142 of the stepped portion 141 may come into contact with the surface of the sleeve 120.

If the sleeve 120 becomes worn by the edges 142, the reliability and lifetime of the motor deteriorate. Therefore, to prevent this problem, recesses are formed in the sleeve 120. The recesses may be integrally formed in the sleeve 120 when the sleeve 120 is formed by molding. The hardness of the rotating shaft 140 is equal to or greater than that of the sleeve 120.

In detail, as shown in FIG. 2, to avoid contact between the sleeve 120 and the edges 142 of the stepped portion 141 formed in the rotating shaft 140, sleeve recesses 121a are formed in the sleeve 120 at positions corresponding to the edges 142 of the stepped portion 141.

The sleeve recesses 121a may have stepped shapes as long as the contact between the edges 142 and the sleeve 120 can be avoided. Alternatively, a single sleeve recess may be formed in the entire surface of the portion of the sleeve 120 that is adjacent to the edges 142.

As such, in the present invention, the sleeve recesses 121a are formed in the dynamic pressure shafting system of the sleeve 120. Thus, when the rotating shaft 140 having the edges 142 rotates, the sleeve 120 can be prevented from being worn by contact between the rotating shaft 140 and the sleeve 120.

FIG. 3 is a partial enlarged sectional view of a spindle motor 100 according to the second embodiment of the present invention. In the same manner as the first embodiment, a stepped portion 141 is formed in the dynamic pressure shafting system of a rotating shaft 140, because a depression cannot be formed in the dynamic pressure shafting system of the sleeve 120 when the sleeve 120 is formed by an injection molding process.

Furthermore, as mentioned above, in the structure wherein the stepped portion 141 is formed in the rotating shaft 140 while the sleeve 120 has no means for avoiding the contact therebetween, when the operation of the motor begins or stops, edges 142 of the stepped portion 141 may come into contact with the surface of the sleeve 120.

If the sleeve 120 becomes worn by the edges 142, the reliability and expected lifetime of the motor deteriorate. Therefore, to prevent this problem, a recess is formed in the sleeve 120. The recess may be integrally formed in the sleeve 120 when the sleeve 120 is formed by molding. The hardness of the rotating shaft 140 is equal to or greater than that of the sleeve 120.

In detail, as shown in FIG. 3, to avoid contact between the sleeve 120 and the edges 142 of the stepped portion 141 formed in the rotating shaft 140, a sleeve recess 121a is formed in the sleeve 120 at a position corresponding to the edges 142 of the stepped portion 141.

In the second embodiment, the sleeve recess 121b has a band shape which surrounds the entirety of the stepped portion 141 as well as including the edges 142.

As such, in the case where the sleeve recess 121b having the band shape is formed in the dynamic pressure shafting system of the sleeve 120, the sleeve 120 can be more reliably prevented from being worn by contact between the rotating shaft 140 and the sleeve 120 when the rotating shaft 140 rotates.

Forming the sleeve recess 121*b* in a band shape may be realized by a turning machining tool or sintering press. Alternatively, the sleeve recess 121*b* may be formed in a band shape when forming a journal groove by ECM (electrochemical machining). Therefore, the process of forming the sleeve recess 121*b* can be simplified. Furthermore, the sleeve recess 121*b* can be formed in the sleeve 120 by ECM regardless of the kind of material.

Furthermore, the sleeve recess 121 which is formed in the dynamic pressure shafting system of the sleeve 120 may have various shapes, as well as including a stepped shape and a band shape, so long as the contact between the edges 142 and the sleeve 120 can be avoided.

As described above, in a spindle motor according to the present invention, a rotating shaft has a stepped portion in a dynamic shafting system. Furthermore, a sleeve recess is formed in a sleeve to avoid the sleeve from being brought into contact with edges formed on the rotating shaft by the stepped portion. Thus, friction between the rotating shaft and the sleeve can be minimized, thereby preventing the sleeve from being worn.

The sleeve recess formed in the dynamic shafting system of the sleeve may have a stepped shape or band shape. Forming the sleeve recess in a band shape may be realized by a turning machining tool or sintering press. Alternatively, the sleeve recess may be formed in a band shape when forming a journal groove by ECM. Therefore, the process of forming the sleeve recess can be simplified. In addition, the sleeve recess can be formed in the sleeve by ECM regardless of the kind of material.

Although the embodiments of the present invention have been disclosed for illustrative purposes, it will be appreciated that the spindle motor according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A spindle motor, comprising:
   a rotational shaft; and
   a sleeve to rotatably support the rotational shaft,
   wherein, the rotational shaft has a stepped portion which is opposite to an outer surface of the sleeve in a fluid dynamic pressure shafting system; and
   a sleeve fitted over a circumferential outer surface of the rotational shaft, with a sleeve recess formed in an inner surface of the sleeve so that an edge of the stepped portion is spaced apart from the sleeve, and the sleeve recess is formed in the sleeve at a position corresponding to the edge of the stepped portion.

2. The spindle motor as set forth in claim 1, wherein the sleeve recess has a band shape which surrounds the stepped portion of the rotational shaft.

3. The spindle motor as set forth in claim 1, wherein the sleeve is formed by molding, and the sleeve recess is integrally formed in the sleeve when the sleeve is formed by molding.

4. The spindle motor as set forth in claim 1, wherein a hardness of the rotational shaft is greater than a hardness of the sleeve.

5. The spindle motor as set forth in claim 1, wherein the sleeve recess is formed by an ECM (electrochemical machining) process.

* * * * *